United States Patent
Kalyan (10) Patent No.: US 7,376,578 B1
(45) Date of Patent: May 20, 2008

(54) COMPUTER-IMPLEMENTED PRODUCT VALUATION TOOL

(75) Inventor: Vibhu K. Kalyan, Plano, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/195,332

(22) Filed: Nov. 18, 1998

Related U.S. Application Data (60) Provisional application No. 60/066,136, filed on Nov. 19, 1997, provisional application No. 60/066,134, filed on Nov. 19, 1997, provisional application No. 60/066,133, filed on Nov. 19, 1997.

(51) Int. Cl.
*G06Q 30/00* (2006.01)

(52) U.S. Cl. ............ 705/10; 705/1; 705/5; 705/7; 705/8; 705/26; 705/27; 705/37; 705/80

(58) Field of Classification Search .......... 705/10, 705/6, 5, 37, 8, 7, 9, 14, 26, 27, 1, 80
See application file for complete search history.

(56) References Cited

U.S. PATENT DOCUMENTS

| | | | | |
|---|---|---|---|---|
| 5,255,184 A | * | 10/1993 | Hornick et al. | 705/10 |
| 5,270,921 A | * | 12/1993 | Hornick | 705/8 |
| 5,377,095 A | * | 12/1994 | Maeda et al. | 705/10 |
| 5,615,109 A | * | 3/1997 | Eder | 705/10 |
| 5,712,985 A | * | 1/1998 | Lee et al. | 705/10 |
| 5,797,127 A | * | 8/1998 | Walker et al. | 705/5 |
| 5,191,523 A | * | 3/1999 | Whitesage | 705/6 |
| 5,897,620 A | * | 4/1999 | Walker et al. | 705/5 |
| 6,032,123 A | * | 2/2000 | Jameson | 705/8 |
| 6,032,125 A | * | 2/2000 | Ando | 705/10 |
| 6,094,641 A | * | 7/2000 | Quimet | 705/10 |
| 6,263,315 B1 | * | 7/2001 | Talluri | 705/10 |
| 6,266,655 B1 | * | 7/2001 | Kalyan | 705/8 |

FOREIGN PATENT DOCUMENTS

| | | | |
|---|---|---|---|
| GB | 2249416 | | 5/1992 |
| WO | WO9011572 | | 10/1990 |
| WO | WO9632683 | | 10/1996 |
| WO | WO9709686 | | 3/1997 |
| WO | WO 9926168 | * | 5/1999 |
| WO | WO 200005669 | * | 2/2000 |

OTHER PUBLICATIONS

Cathy Lazere; "Different Strokes: With Efficient Processes at Full Tilt, Smart Companies Tailer Prices to Customers;" CFO Magazine; all, Apr. 1998.

Trilogy Development Group, Inc.; "SC Pricer;" All Pages© 1997, 1998); all.

* cited by examiner

*Primary Examiner*—Nga Nguyen
(74) *Attorney, Agent, or Firm*—Booth Udall, PLC

(57) ABSTRACT

A method of valuing products based on demand probabilities. Products are designed by identifying product components, and combining the components in various combinations to provide standard and non-standard products. Components are valued using an algorithm that considers demand probability as well as known prices of standard products. The component values are added to determine product values and may be used to make pricing and order fulfillment decisions.

5 Claims, 5 Drawing Sheets

COMPUTER-IMPLEMENTED PRODUCT VALUATION TOOL

RELATED PATENT APPLICATION

This application claims the benefit of U.S. Provisional Application No. 60/066,133, filed Nov. 19, 1997 and entitled "Computer Implemented Method and System for Value Management and Optimization for a Make-to-Order (MTO) Manufacturer"; U.S. Provisional Application No. 60/066, 134, filed Nov. 19, 1997 and entitled "Computer Implemented System and Method for Value Maximization"; and U.S. Provisional Application No. 60/066,136, filed Nov. 19, 1997 and entitled "Computer Implemented System and Process for Value Maximization (VM) Determination of Lead Time Based Pricing for Material Intensive Industry".

TECHNICAL FIELD OF THE INVENTION

This invention relates to computer-implemented enterprise management tools, and more particularly to a computer-implemented method of calculating product values, with the values varying in accordance with demand forecasts, as well as lead times and delivery times when appropriate.

BACKGROUND OF THE INVENTION

One of the unique challenges of any manufacturing enterprise is pricing of its end products. Traditionally, these prices are computed on the basis of a cost-plus measure and some measure of the ability of the customer to pay.

In recent years, computer-implemented enterprise management tools have been developed to assist in management decisions. These tools often include pricing tools, intended to assist in the pricing process.

Although product pricing methods have been developed for airlines, such tools are not necessarily suitable for manufacturers. For example, many manufacturers (referred to as "material intensive manufacturers) have limited materials (components) rather than capacity. Demand is probabilistic and is not in a particular order for different prices, as is the case with airline travel.

SUMMARY OF THE INVENTION

One aspect of the invention is a computer-implemented method of valuing products. Products are valued in terms of their components. Typically, products are either non-standard or standard, depending on the particular combination of components. Products having a known price are considered standard products. Demand probability values are assigned to each of the products. A component value is obtained for each component, by performing the following steps: (a) assuming a beginning value for each component; (b) for a first component, calculating prorated values, such that for products using that component, a prorated value is calculated on that component by calculating the difference between the product price and a value of the product's other components; (c) calculating a component value as a function of the prorated values and the demand probability values; (d) repeating steps (b) and (c) for all components; (e) determining whether the component values converge; and (f) if any component value does not converge, using the calculated component values as the beginning component value and repeating steps (b) through (e) for that component; and calculating a value for each product by adding the component value of each component of that product.

An advantage of the invention is that it provides a method of pricing product options in a manner that considers probabilistic demand. Prices can be set so as to accommodate the opportunity cost of critical components. Non-standard products can be designed and priced by considering prices for standard products, availability of critical components, and probability of demand for standard products.

The method can be extended to price lead time terms for ordering products. It can also be extended to price products in accordance with varying delivery times, a method that is particularly useful for make-to-order manufacturers.

DETAILED DESCRIPTION OF THE INVENTION

Figure 12:
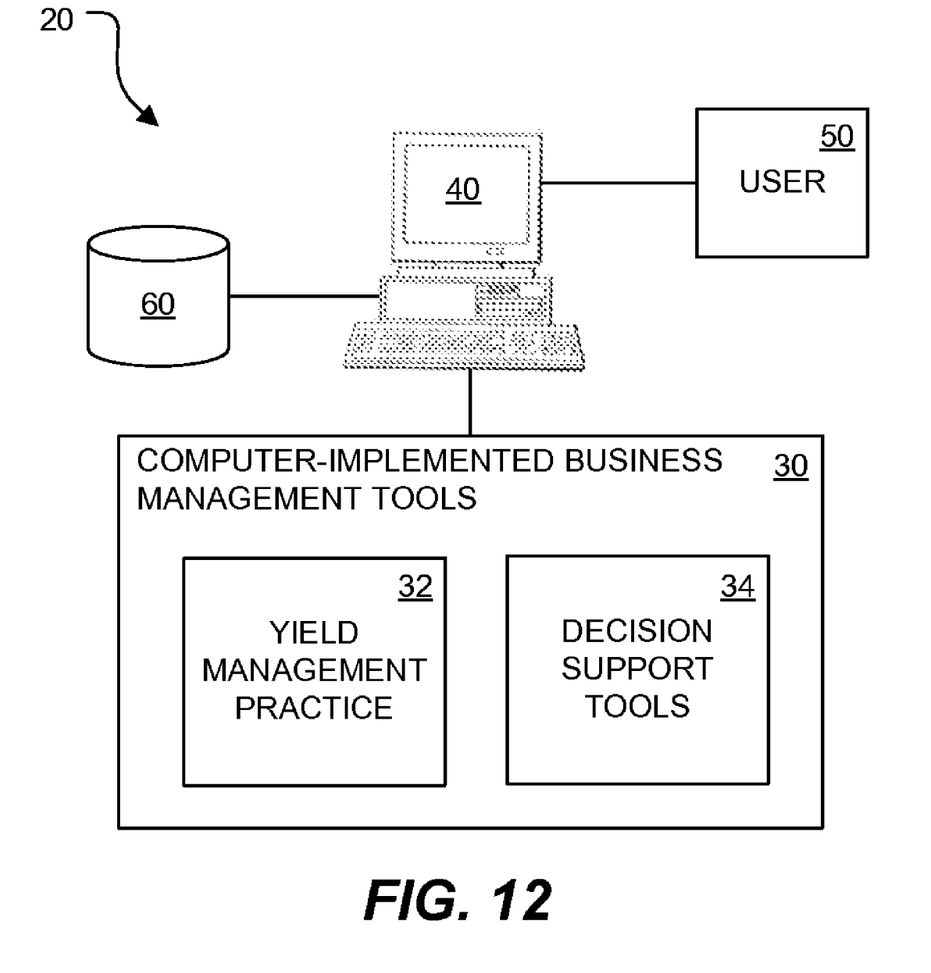
FIG. 12 illustrates a computer-implemented tool according to one embodiment of the present invention.

The following description is directed to a computer-implemented tool 20, as shown in FIG. 12, that implements a "value management" (VM) pricing method. This pricing tool is a synthesis of two other computer-implemented business management tools 30: yield management practice 32, such as is used by airlines to price tickets, and tools for decision support 34 across supply chains, such as are commercially available from i2 Technologies Inc. The present invention is a novel combination of these two software applications, and can be beneficial in a number of areas, such as pricing, product design and product control. In general, the invention can be implemented as program code and data, which are executed on a computer system 40 and provide results to a user 50 both as stored data 60 and displayed data.

Value Management for Product Pricing

Value management may be used as a pricing solution that balances supply with demand. As explained below, the prices of components that make up a product are determined based on probabilistic demand and available supply. More specifically, using statistical forecasts for standard products (SP) that consume known amounts of some underlying materials, called critical components (CC), together with known prices for the SPs, the values of the CC's are calculated based on their available supply at the time of the calculation. The CC values are calculated using an iterative process.

For purposes of this description, the following parameters are defined:

| | |
|---|---|
| N | number of different CC's that are used in building various products |
| $A_h$ | the amount available of the $h^{th}$ component h = 1, 2, . . . N |
| M | number of standard products being offered for sale |
| $P_k$ | the offered price for the $k^{th}$ product, k = 1, 2, . . . M |
| $F_k(x)$ | cumulative density function (CDF) for the $k^{th}$ product |
| $S_k$ | ordered set of components used to build the $k^{th}$ product, referred to herein as the component set (CS) |
| $Q_{rk}$ | consume per of $r^{th}$ component in $S_k$, r = 1, 2, . . . $C_k$, referred to herein as the component usage set (CUS) |

The pricing problem assumes a limited availability of CC's, and a number of non-standard products (NSPs) that can be built using varying amounts and combinations of CC's along with SP's. The task is how to determine values for non-SPs, which are not predefined, unlike SPs whose prices are known as part of the inputs? Also, should any order for a product (SP or NSP) be satisfied so long as there are the resources (CC's) to make it? In other words, is the pricing policy to be first-come first-serve (FCFS) for any product order? Or is control to be exercised, whereby an order may be accepted or rejected based on some criteria?

A distinction is made between price and value. Price of a SP is an input that serves as a starting amount that the customer is willing to pay for the product and has an associated probability distribution that specifies the probability of various levels of unconstrained demands (irrespective of availability of CC's or any constraining factor). Value on the other hand is the customer's willingness to pay for a product balanced with the supply of the product. For purpose of this description, the difference is that "value" is computed by explicitly applying the supply and demand law on the inputs that consist of, in addition to others, available supply and demand, while "price" is used as an independent variable to determine value. At times the two terms may be used interchangeably, but the context should make clear which meaning is in force. "Price" is also used in the context of the price that is asked of a customer, which need not be the computed value. Rather, value serves as a reference that can be used for price negotiation.

Determining values for all possible combinations of CCs would be a difficult and intractable problem. Instead the pricing method focusses on individual CC's and determines their values. As explained below, to determine the value of any product, it is first determined what CC's the product consumes and the amount consumed per unit (consume_per). Then the values of the CCs consumed are calculated and added to arrive at a value for the product. The problem is thereby reduced to that of determining the values for the CC's.

Optimal prices for components are a function of controlling the sale of the product. FCFS is one type of control (or no-control). Another control is setting explicit allocations for various products, but this may be impractical when there are a large number of products and not all of them are predefined. The following control strategy is suitable for use with the present invention. If $V_i$ is the value of $i^{th}$ component, then:

$$MAV^p = \sum_{i \in S^p} Q_i^p V_i,$$

where $S^p$ is the set of components used by product p (not necessarily a standard product), $MAV^p$ is the minimum acceptable value for product p, and $Q_i^p$ is the consume_per value for product p for component i. An alternative to a FCFS policy is a control policy that permits a product p to be sold if its price is greater than $MAV^p$. This control policy is referred to herein as MAV control (MAVC).

Assuming a MAVC pricing control policy, the pricing problem may be solved as an optimization problem, in which the task is to maximize the total expected revenue, R(V, A), to come at time t, where:

$V=(V_1, V_2, \ldots V_N)$=vector of component values at time t $A=(A_1, A_2, \ldots A_N)$=vector of available supply of components at time t $P=(P_1, P_2, \ldots P_M)$=vector of SPs with prices at time t $F=(F_1(x), F_2(x), \ldots F_M(x)$=vector of CDF's for each of the M products, where x=0, 1, 2, . . . , and represents demand-to-come at time t $S=\{S_1, S_2, \ldots S_M\}$=ordered set of components, CS, for each SP, where $S_k=\{L_1, L_2, \ldots L_{i(k)}\}$, $L_1<L_2 \ldots <L_{i(k)}$ $Q=CUS=\{Q_{L1k}, Q_{L2k}, \ldots Q_{Li(k)k}\}$ If solved in its most general form, the pricing problem is nonlinear and complex. Even without introducing the time variable t, it is difficult. It has a discrete variable, x, and a continuous variable, V, making it a mixed integer non linear program.

The pricing problem can be simplified by making several assumptions: assume x is continuous, an assumption that is good for large values of x; drop the dependence on t, solve a static problem at a given value of t, and model the effect of varying t by repeatedly revising the solution in real time; when possible model $F_k(x)$ as a known distribution, for example, a normal distribution. The latter assumption allows specification of the demand distribution by only a few parameters. For a normal distribution, the assumption permits distribution to be specified as the mean and the standard deviation of each demand. If needed, a truncated form of the distribution can be used to disallow negative values.

Figures 1, 11:
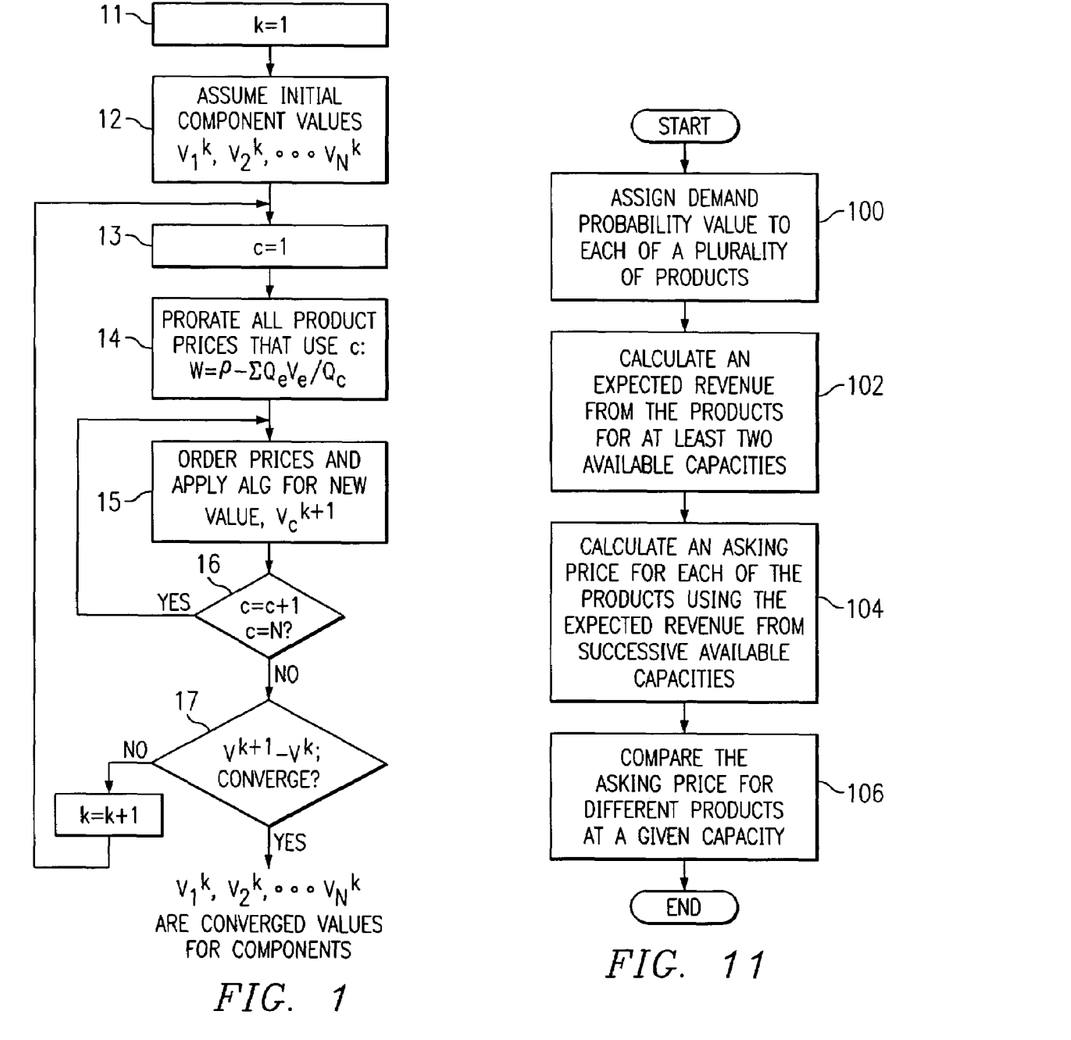
FIG. 1 illustrates a method of pricing products in terms of their components, using probabilistic demand calculations in accordance with the invention.
FIG. 11 illustrates an exemplary method of pricing make-to-order products.

FIG. 1 illustrates the steps of a heuristic method that provides optimal values of component prices, V. Step 11 is initializing an increment counter value, k. Step 12 is assuming a set of beginning values for the components. Step 13 is selecting a first component, such that c=1.

Step 14 involves calculating a value, w, that represents the prorated value of a product on a component. Given a price p for a standard product, a vector V of component values, and its CS given by S, its prorated value, w, on a component c (belongs to its CUS), is:

$$w = \left(p - \sum_{i \in S, i \neq c} Q_i V_i\right) \bigg/ Q_c \qquad (1)$$

where $Q_c$ is consume_per for the product for component c.

A property of this proration is that if for converged values of V, w is greater than $V_c$, then it follows that:

$$p > \sum_{i \in S} V_i$$

which is equivalent to p being an acceptable price.

An interpretation of Equation (1) is that the value the product brings for component c is its price minus the value displaced from all the other components it uses. Dividing the displaced revenue by the consume_per for c gives the value per unit of component.

Step 15 is calculating a new component value, given known prices of products and their associated demand probability distributions. Typically, the "known" prices are those of standard products that use the component. For the description of the process, we assume the calculation of Step 15 to be use a process referred to herein as ALG.

The ALG process is described herein by example. Three products and two critical components are assumed.

| Product Price | Forecast | Component Set | Component Usage Set |
|---|---|---|---|
| P1 | Prob. {demand = 1} = p1 | {1, 2} | {1, 1} |
| P2 | Prob. {demand = 1} = p2 | {1} | {1} |
| P3 | Prob. {demand = 1} = p3 | {2} | {1} |

The available supply of each component is 1. O12 is the probability that demand for product 1 (price P1) arrives before that of product 2. O21 is the probability that demand for product 2 arrives before that for product 1, or O21=1−O12. Similarly, O13 is the probability that demand for product 1 arrives before that of product 3. It is assumed these probabilities can be computed as:

$O12=p1/(p1+p2)$ $O21=p2/(p1+p2)$ $O13=p1/(p1+p3)$ $O23=p2/(p1+p3)$

As explained below, the component value calculations use values representing both the probability that demand will materialize, i.e., p1, p2, p3, and the probability that demand will arrive in a certain order, i.e., O12, O21, O13, O23.

Where the two component values are V1 and V2, the initial estimate of component values is V11 and V21. Set k and r to 1.

Prorated values on component 1 from each product using it are calculated as:

| Product | Prorated on Component 1 |
|---|---|
| 1 | P11 = P1 − V2r |
| 2 | P2 |

The component 1 value is computed by letting MV1=p*MAX(P11, P2), where p=p1 or p2 depending on whether the first or the second term is maximum, respectively. Then, $MV2=O12(p1*P11+(1-p1)*p2*P2)+O12*(p2*P2+(1-p2)*p1*P11)$ The new value for component 1 is:

$V1k=\mathrm{MAX}(MV1,MV2)$

Prorated values on component 2 are calculated as:

| Product | Prorated on Component 2 |
|---|---|
| 1 | P12 = P1 − V1k |
| 3 | P3 |

The component 2 value is computed by letting MV1=p*MAX(P12, P3), where p=p1 or p3 depending on whether the first or the second term is maximum, respectively. Then, $MV2=O21(p1*P12+(1-p1)*p3*P3)+O22*(p3*P3+(1-p3)*p1*P11)$ The new value for component 2 is:

$V2r=\mathrm{MAX}(MV1,MV2)$

If V1k and V2r have converged, the ALG process is ended. Otherwise, the proration and ALG steps are repeated by incrementing k and r. The converged values are the "values", or the prices for the two components.

The following table illustrates the results (component values V1 and V2) of the calculations above for various input values (P1 and P2 prices and demand probabilities). Due to a convergence criterion of 0.5, the values have a precision of ±0.5.

| P1 ($) | p1 | P2 ($) | p2 | P3 ($) | p3 | V1 ($) | V2 ($) |
|---|---|---|---|---|---|---|---|
| 2500 | .5 | 1500 | .5 | 1500 | .5 | 1090.9 | 1090.9 |
| 2500 | .9 | 1500 | .5 | 1500 | .5 | 1244.8 | 1244 |
| 2500 | .5 | 1500 | .8 | 1500 | .5 | 1351.8 | 993.09 |
| 2500 | .5 | 1500 | .5 | 1500 | .8 | 993.1 | 1351.8 |
| 2500 | .5 | 2000 | .5 | 1500 | .5 | 1309 | 1009.1 |
| 2500 | .5 | 1500 | .5 | 2000 | .5 | 1009 | 1309.1 |

These component values represent values for a given time horizon, i.e., one day, for which demand distributions and other inputs are specified.

Figure 2A:
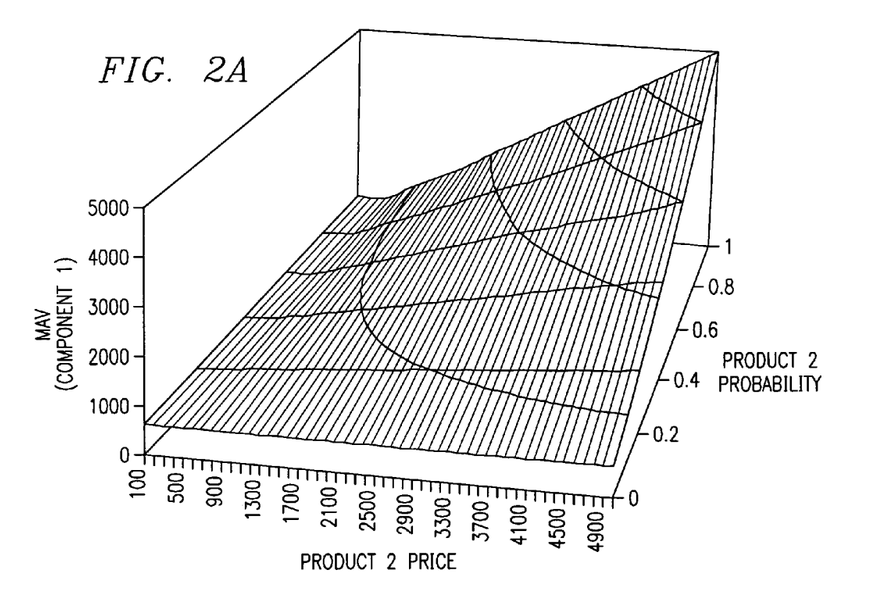
FIGS. 2A and 2B illustrate how component values, product prices, and product demand probabilities can be graphically represented in three dimensions.
Figure 2B:
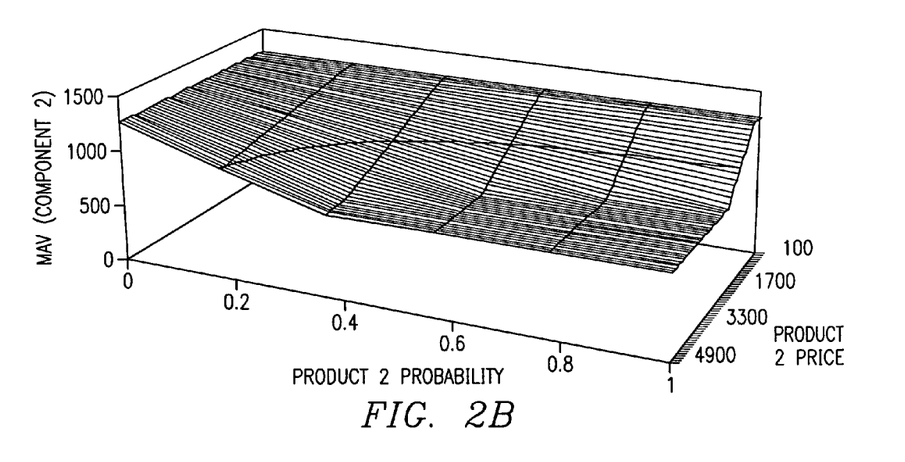

FIGS. 2A and 2B illustrate how component values, product prices, and product demand probabilities can be graphically represented in three dimensions. A component values is identified as a MAV (minimum acceptable value) as calculated above. FIG. 2A illustrates the MAV for component 1 and the price and demand probability for product 2; FIG. 2B illustrates the data for component 2.

For purposes of the method of FIG. 1, demand distributions can be modeled as normal, poisson or binary or some known distribution, which require only a limited number of parameters. For normal, only mean and standard deviation is required. The pricing calculations can be modified to accommodate various distributions.

For the inputs to the process, some pricing information, such as an elasticity curve, is needed. These input prices are for SPs only, and may be prices that a business is already comfortable with or obtained from price-demand curves. As explained above, these prices are used to arrive at component values, which in turn can be used to price NSPs based on supply and demand. The component values represent a mapping of forecasted SP demand (with uncertainty) and SP prices onto a limited supply of components. In fact, if SPs were repriced based on these component values, the result would be a lower value since the average revenue for a probabilistic demand for a fixed price is less than the price. However, when selling an NSP, it should be determined how much revenue is being displaced that could have been made at the SP prices and probabilistic demand. Also, when using the component values to negotiate prices, the pricing process may consider factors such as competitive prices and costs.

Calculated component values can be the basis of a variety of pricing decisions. For example, a component that has a 0 component value indicates an oversupply of the component or a lack of demand—two sides of the same coin since oversupply is with respect to demand only. If all components have 0 component values that means there are no critical components. But this does not imply a selling price of $0. This situation also suggests potential oversupply or lack of demand. If it is known that a new product is going to be introduced that will adversely affect the current line of products, the affected component values may drop to a very low value, indicating that the current line should be quickly unloaded.

The above-described component value calculation provides a minimum acceptable value (MAV) for a component, which differs for different production days. An enhanced process can implemented to take all component values as inputs across a time horizon and perform a smoothing operation, to obtain uniform component values for each component across the time horizon. The physical meaning of this operation is that material supply is moved forward in time. Each component then has the same MAV for all future time horizons. As a by product of this step, it is conceivable that this inventory movement could be used to adjust the supply alignment with the suppliers, given enough lead time. Assume a manufacturer has a certain supply arrangement of materials for each day over the next several days. After calculating component values, a new arrangement can be designed, optimized with respect to supply and demand. The plan may be changed repeatedly, as often as the calculation of component values is carried out.

The process described above to calculate pricing for a three-product two-component case can be generalized to include more complex situations. Examples of complexities are: inclusion of available supplies of components to be greater than 1; more complex continuous probability distributions for demand of products; consume_per of components greater than 1; multiple time horizons, where component values that differ over various time horizons will are smoothed so only one value is seen over all horizons; generalization to volume orders (similar to group bookings for airlines); and inclusion of demand and/or price curves for products instead of a static value.

Figure 3:
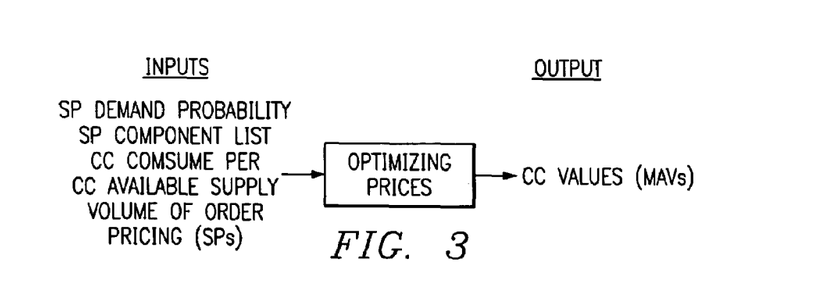
FIG. 3 represents the pricing process in terms of its inputs and outputs.

FIG. 3 illustrates the pricing process in terms of its inputs and outputs. The inputs are: unconstrained demand distribution of each SP for each time horizon of interest, price offered for each SP, component list for each SP, the consume_per of each component for each SP, the available supply of each critical component for each time horizon of interest, volume of order, pricing and demand curves as a function of time (if known). The outputs are: value for each critical component for each time horizon, and optionally, a smoothed value for each critical component over all time horizons of interest.

Value Management for Lead Time Pricing

The above-described value management (VM) pricing process can be extended to determine pricing based on varying lead time requirements of the customer. An environment in which lead time pricing might operate is one in which a manufacturer is negotiating a price with a customer. For example, the manufacturer might be attempting land an order of, say 50,000 personal computers (PC's). The customer typically wants various options, configurations and each option or configuration in specific quantities delivered over a specified time period. The customer does not want the complete order delivered at the same time. Rather, it wants the flexibility to call anytime during the specified time period to draw against this bulk order, each time the quantity requested not exceeding an agreed upon number, Q. But once the order is placed, the delivery should occur within LT weeks.

Given these conditions and given the capacity to fill the order, lead time pricing method determines answers to the following issues: What price to quote to the customer for each option (each option is a particular type of PC requiring certain components to build it) based on Q? How does this price vary as a function of LT? What is the maximum frequency of customer orders that should be negotiated? Is there an economic value that can be assigned to this frequency?

The lead time pricing method focuses on the value of the constrained resource (materials) based on the projection of future sales of SPs that can be made from the materials, the advertised prices for the SPs, and the available supply of materials. In the method described above in connection with FIG. 1, it was shown how, given an available supply of constrained materials, and probabilistic demand of SPs and their prices, the values of the critical components can be computed.

The component values (MAVs) calculated in accordance with FIG. 1 are marginal values, that is, the value obtained from the last unit of the available supply of each component. However, when the consumed supply of a component for an order is much greater than 1, the expected revenue that is displaced in generally not marginal value times the quantity consumed. This is because in a limited supply and high demand situation, each additional unit of supply costs more than the previous one.

Figure 4:
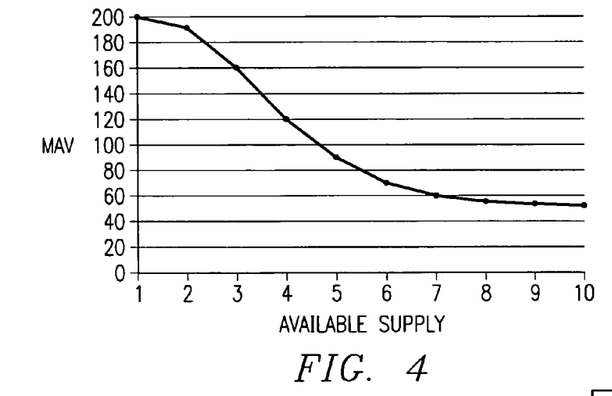
FIG. 4 illustrates MAV values as a function of available supply.

FIG. 4 illustrates a typical MAV curve as a function of the supply of a critical component. The curve is usually monotonically decreasing although its slope decreases at either end and is maximum somewhere close to the middle. The area under the curve is the expected revenue from the available supply of the component. When the demand is much less than the supply, the MAV approaches 0. Because demand is probabilistic, "demand less than supply" is meant in a probabilistic sense. Generally, it is mean+3*standard deviation, which covers, for a normal distribution, close to 99.991 of possible demand values.

The curve of FIG. 4 illustrates how MAV varies as a function of supply of material for a particular time horizon, i.e., one day. As stated above, MAV can be thought of as the value of the last unit of supply. The price to charge for a quantity Q for that day is not Q*MAV because MAV increases as each unit of supply is consumed. For Q less than some threshold, it may be acceptable to charge MAV as the price for each unit, but for larger Q such a price is unacceptable.

Figure 5:
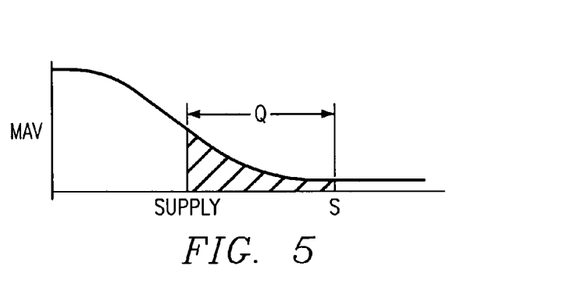
FIG. 5 illustrates the revenue displaced by charging MAV for a quantity Q.

FIG. 5 illustrates the revenue displaced by pricing a component at MAV for a quantity Q. The total area under the curve is the total potential revenue from a supply S of the component. The shaded area represents the displaced revenue. The displaced revenue is not simply the MAV at S because as Q is removed (S decreases), the MAV increases.

The floor for the negotiating price per unit of product for that component should be equal to:

Revenue Displaced/Q

For a product having multiple components, a MAV versus supply curve for each component must be considered.

As stated above in connection with FIG. 1, the pricing process can be interpreted in terms of displaced revenue. In FIG. 5, the displaced revenue could be calculated by integrating the curve between S and S−Q. However a simpler variation uses the MAV process described in connection with FIG. 1 to obtain a total potential revenue from a given supply, S. Then revenue from the MAVs for S−Q is similarly calculated. The difference in revenues between the two cases approximates the area of the curve between S and S−Q, and thus approximates the revenue displaced by the MAVs for Q. In other words, the formula for MAVs is applied with the displaced revenue coming from solving the MAV problem twice. For a product having multiple components, the MAVs are calculated for each components and the component revenues added, thereby obtaining revenues for the product.

In the method of FIG. 1, there was no mention of lead time. The quantity Q was that for a particular horizon, say a day. That is, all of Q were going to be produced during the day in question. In reality, a customer will often agree to limit orders for a total of Q over a contract period of, say a year. Each time the customer calls, the maximum quantity will be $Q_{max}$. However delivery will be expected within a time period, LT.

The value management pricing process can be used to determine what the negotiating price should be for a specified lead time. For purposes of this description, the following assumptions are made: the orders for $Q_{max}$ will come randomly and uniformly distributed within the period of contract; a subsequent order will only come after a current order has been fulfilled; the time it takes to manufacture the order is equal to LT, i.e., delivery is instantaneous; the horizon for MAV's is daily.

With regard to the above assumptions, the assumption of uniform order distributions is to simplify analysis—other order distributions can be handled. The second assumption can be relaxed and generalized so as to become a negotiating variable with the customer. The third assumption is easy to relax, by adding another offset to the manufacturing period. The fourth assumption can be generalized such as to include multiple days' horizon or several horizons within a day.

Figure 6:
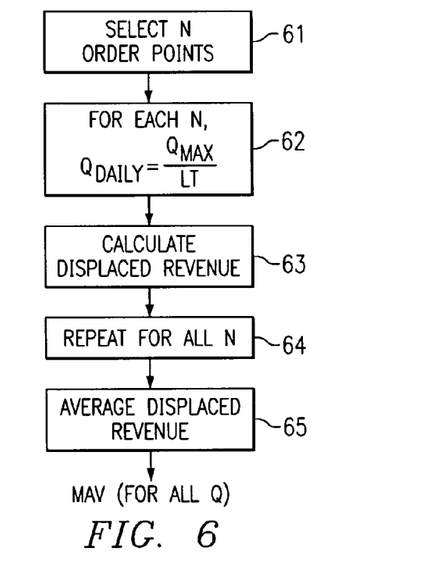
FIG. 6 illustrates a process of determining MAV for lead time pricing.

FIG. 6 illustrates a method of determining MAV for lead time pricing. The method assumes a MAV curve such as that of FIGS. 4 and 5, which may be obtained using the pricing process of FIG. 1. Step 61 is randomly selecting a sample of N order points over the contract period with equal probability. In Step 62, for a first order point, consider the next LT days and set $Q_{daily}=Q_{max}/LT$. In Step 63, determine the displaced revenue. In Step 64, repeat for all the sample points. In Step 65, calculate the average displaced revenue. The result of the average is a floor on the negotiating price for the quantity Q, referred to herein as $MAV_{negotiation}$. For a product having multiple components, the process of FIG. 6 is repeated for each component and the results added together.

Figure 7:
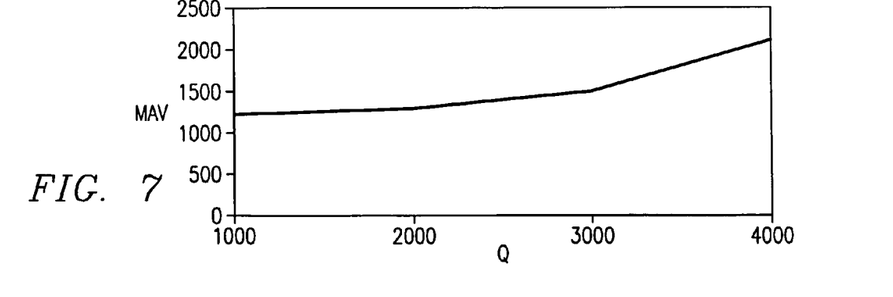
FIGS. 7 and 8 illustrate MAV as a function of order size, Q, and lead time, LT, respectively.
Figure 8:
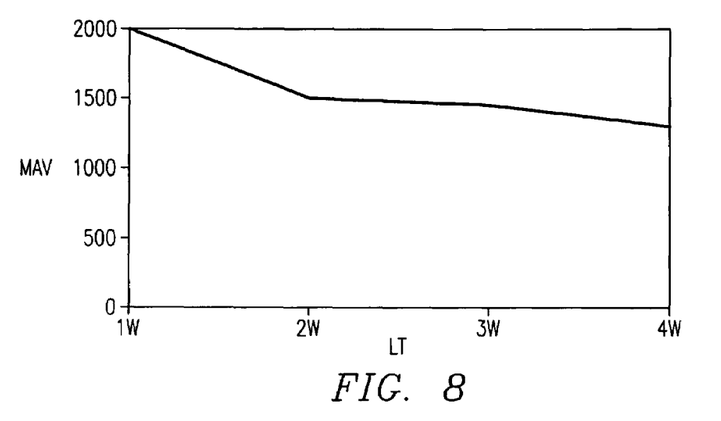

FIGS. 7 and 8 illustrate MAV as a function of maximum order size, Q, and of lead time, LT, respectively. The MAV values are those calculated using the process of FIG. 6.

As part of negotiations, a manufacturer could insist on granting no more than a certain number of orders, $Q_{maxfreq}$, drawn against the total order over the contract period. Each order is a disruption on manufacturing operations, which the manufacturer would like to minimize. The order frequency is tied to $Q_{max}$, in that a higher number generally reflects a lower frequency. But there is nothing preventing the customer from making a large number of small orders and still be within the contract unless $Q_{maxfreq}$ is agreed upon. To accommodate order frequency, the process can include additional steps: First, assume a worst case of $Q_{max}$ occurring $Q_{maxfreq}$ times even though $Q_{max} \times Q_{maxfreq}$ may be greater than the total order quantity, Q. Next, set the total displaced revenue to be $R_{max}=MAV_{negot} \times Q_{max} \times Q_{maxfreq}$. The new negotiated price is $MAV_{negotiation-maxfreq}=R_{max}/Q$. This method overestimates revenue and spreads it over a smaller quantity Q to take into account the higher allowed frequency. A related quantity to maximum frequency could be the minimum gap between subsequent orders. It can be converted into a corresponding maximum frequency to calculate the price quote.

Value Management for Make-to-Order Pricing

Make-to-order manufacturers (MTOs) are characterized by low inventory and cycle time. Many hi-tech manufacturers such as computer system integrators fall into this category. They cater to retailers as well as to individual customers, taking orders by telephone or online. MTOs tend to not produce a product until it is ordered. Usually MTOs advertise their items at a fixed price, with a maximum delivery time. At times, they may deliver sooner if the customer. However, conventionally, the price charged is the same, barring any volume discounts.

Another aspect of the present invention is directed to how MTOs can benefit from value management (VM). As explained above, a basic idea behind VM is components can be valued in terms of probabilistic demand. These values can be used to define products that provide greater value and to arrive at a product control policy. The net effect of the product design and a product control policy can be significant gains in profit margins.

Figure 9:
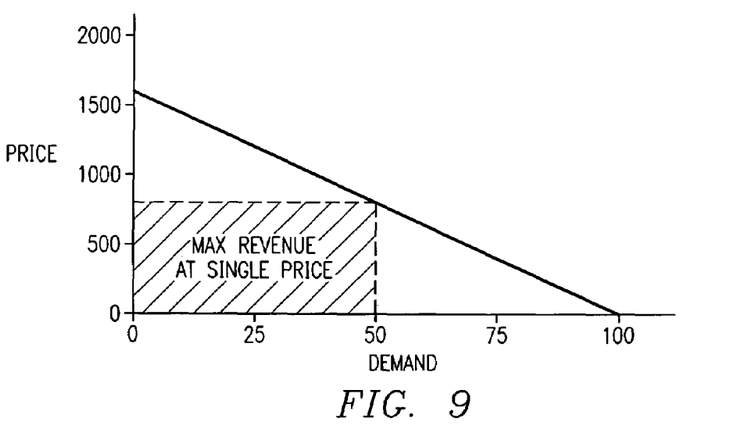
FIG. 9 illustrates a price-demand curve for a product, and compares maximum revenue at a single price to total potential revenue at multiple prices.

FIG. 9 illustrates a linear price-demand curve for a product, P. As explained below, when only a single price is to be charged, the curve can be used to determine an optimal price. The curve can also be used to determine a total potential revenue that could be realized (theoretically) if multiple prices were charged.

Suppose a MTO manufacturer sells P at a fixed price of $800. At $1600, the demand is almost 0, and at 0, the demand is high (limit it to 100). From this information, the single price at which total revenue is maximum can be determined. If any (price, demand) pair on the curve is chosen as (r,d), the total revenue, R, is:

$R=rd$ and the equation for the line is:

$r=md+c$ where m=−1600/100 and c=1600. Multiplying both sides by d, then:

$$R = d(md + c)$$
$$= md^2 + dc$$

and taking the derivative:

$dR/dd=2md+c$

To maximize R, the derivative is set to zero, thus:

$$0 = 2md + c$$

$$d = -c/2m = 1600/32 = 50$$

$$r = -16(50) + 1600 = 800$$

The realized revenue from the single price of $800 is 800*50=$40,000.

However, the total revenue "potential" (one that would result from charging different prices for different demands) is 100*1600/2=$80,000. Thus, a single price that maximizes revenue ($800) is only half the total potential revenue that could be realized from different prices for different products. The potential revenue is:

$$(-c/2m)(md + c) = -cd/2 - c^2/2m$$

The maximum revenue is:

$$R_{max} = -c(-c/(2m))/2 - c^2/2m$$
$$= -c^2 \div 4m$$

The potential revenue is $cb \div 2 = -c/2m = 2(R_{max})$, hence the result.

If the goal is to maximize profit (revenue−cost) then under the assumption of fixed cost, equations for profit can similarly be derived as follows:

$$p = r - z$$
$$= md + c - z + md + (c - z)$$

where p is the profit per unit of product, the new intercept is m−z in place of c, and z is the fixed cost per unit of product. Total profit P is:

$$P = rd - dz$$
$$= d(md + c) - dz$$

The maximum profit (for a single price) occurs at $d = -(c-z)/2m$ and the corresponding maximum profit is:

$$P_{max} = -(c-z)^2/4m.$$

The total potential profit is:

$$P_{pot} = \int_0^{-c/m} (mx + (c-z))dx = mx^2/2\big|_0^{-c/m} + (c-z)x\big|_0^{-c/m}$$
$$= c^2/2m - (c-z)c/m = -c^2/2m + cz/m = -(c-z)^2/2m + z^2/2m$$
$$= 2P_{max} + z^2/2m$$

The second term is negative because m is negative. As z increases, the potential profit compared to that for single price (optimum) decreases. For reasonable values of z, the potential increase in profit is substantial.

One aspect of the invention is realizing, for a MTO manufacturer, the potential profit opportunity described above. Suppose the item is a personal computer, which the MTO sells that for a price of $800, with a delivery time of 3 weeks. However, if the customer wants it the next day it could be done but for a price of $1200. Another price-delivery pair might be ($1100, 1 week). Once these products have been designed, there is a need for product control. The manufacturer does not want to simply fill the demand for various products as it comes in, but would rather deny some in the hope that there will be later demand. To make an objective evaluation, there needs to be a forecast of demand for the products out in future.

Thus, there are two levels of benefits. A first involves redesigning product and delivery times. A second involves forecasts of demand and an effective product control (PC) policy. Value management is fully realized by taking advantage of both levels of benefits. Product design is insufficient because of limited capacity (capacity includes both assets and materials), and without product control, the MTO may end up not realizing higher paying demand if demand at lower prices is high and comes first.

Assume that the process of product design yields the following products for a laptop manufacturer:

| Item | Product | Price ($) |
| --- | --- | --- |
| Laptop = P | P (1 day delivery) | 1200 |
| P | P (1 week delivery) | 1100 |
| P | P (3 week delivery) | 800 |

Based on a price-demand curve such as that of FIG. 9, demand values can be assigned as single deterministic numbers. But in reality, demands are stochastic and are better characterized by a probability distribution. A better approach is to assign demand values for different "buckets" of prices. To this end and as a simple example, assume that the demand is 1 unit with a probability of 0.5. That is, there is a 50% chance the demand of 1 may not materialize. The demand probability table looks like:

| Product | Price ($) | Demand | Probability of the demand materializing |
| --- | --- | --- | --- |
| P1 (1 day delivery) | 1200 | 1 | .5 |
| P2 (1 week delivery) | 1100 | 1 | .5 |
| P3 (3 week delivery) | 800 | 1 | .5 |

It is assumed that each laptop needs 1 unit of some scarce material. The PC is assumed to be first-come first serve (FCFS).

Appendix A compares expected revenues with and without product design (PD) for various values of available capacity (AC), measured as the units of the scarce material available for a particular time unit, say, one day, of manufacturing. "AP" is asking price (explained below), and "ER" is expected-revenue. For the non-PD case, there are 3 items with the same price of $800. For the PD case, the 3 products are P1 ($1200), P2 ($1100) and P3 ($800). By definition, the order in which they arrive is P3, P2 and P1. The same labels indicate the corresponding price, and the context will make clear what the label means. The control policy is assumed to be FCFS.

The following are the general formulas for AC=3, 2 and 1, with s1, s2 and s3 denoting the corresponding probabilities (assumed to be 0.5 in this case). Also, q1=1−s1, q2=1−s2 and q3=1−s3. ER(n) is the expected revenue for available capacity of n.

| AC | Formula for Expected Revenue under FCFS |
|----|------------------------------------------|
| 1  | s3P3 + q3(s2P2 + q2s1P1)                 |
| 2  | s3(P3 + s2P2 + q2s1P1) + q3(s2(P2 + s1P1) + q2s1P1) |
| 3  | s3(P3 + s2(P2 + s1P1) + q2s1P1) + q3(s2(P2 + s1P1) + q2s1P1) |

Here P1, P2 and P3 denote prices.

In Appendix A, the units of capacity (and the resulting APs) are for a given time horizon, i.e., one day. In the first row is the expected revenue for values of available capacity under the assumption that the same revenue ($800) is received from even those customers who would have paid a higher price. The expected revenue (ER) from the last single product for a given capacity is the difference between the ER for the AC minus the ER from one less AC, resulting in the AP. The value of each additional unit of capacity goes down as AC increases, everything else remaining same. The additional value of a unit of capacity is related to PC, as will be explained below.

Figure 10:
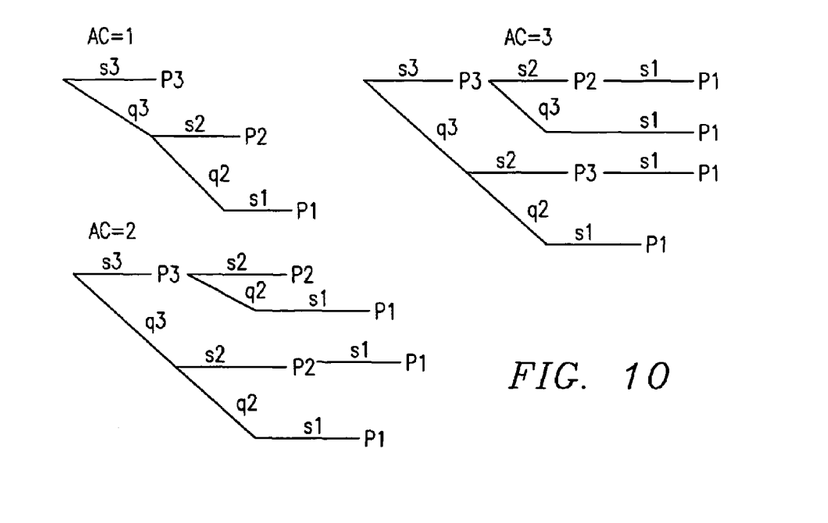
FIG. 10 illustrates how expected revenue for a make-to-order manufacturer can be calculated from a binary tree.

FIG. 10 illustrates how the expected revenue for a MTO manufacturer (different prices for different delivery times for the same product) can be graphically represented as a binary tree. The formulas for ER are the same as set out above.

No forecasts are needed for first-come first-serve (FCFS) as a PC policy, but are used for other PCS. The following discussion explains how using a PC policy other than FCFS adds additional revenue opportunity. Prices are called "values", understanding that it is assumed that the cost is zero. That is not true, but for the purposes of example, the assumption is that price is the same as value, and when cost data is available adjustments can be made.

Appendix B sets out APs and ERs, assuming a PC (non FCFS). The PC is that at any given time, for various units of capacities for particular time horizons (days for example), for each row (product), calculate the ER from those resources (capacities) if it is decided to accept an order. For AC=1, PC(3W), the ER is $825 as opposed to $850 if only PC(1W) were accepted. Thus for optimal control, PC(3W) for AC=1 should be rejected. $850 is the asking price for AC=1. This is the minimum price (value) to accept. At AC=1, PC(3W) ($800) is rejected since its ER is less than the AP. However as the AC increases, the value of the added capacities goes down. For AC=2, any order is accepted; the AP (ER(2)−ER(1) under optimal control) is $550 and is less than the ER for the lowest product offering. AP goes even lower at AC=3 ($150) and ultimately to 0 at AC=4.

The asking price (AP) for a given value of AC is the maximum expected revenue for this last unit of capacity. Thus for AC=1, AP=$850 with the control policy being to reject PC(3W). As stated above, AP is a function of PC. Comparing the results of Appendices A and B, for AC=1, the AP for the non-FCFS PC policy is $850 versus $825 for FCFS. At AC=2, it is higher for FCFS simply because it was sub optimal for AC=1. At AC=3, the two are the same and the two controls become the same operationally. Generally a PC policy is needed when there is limited capacity with respect to demand.

Typically, business practice does not allow for varying prices for the same physical item since the customer does not perceive added value. However by recognizing that there is an underlying higher paying customer demand that can be tapped by tying delivery time to the product, more revenue is extracted. A control mechanism assigns allocations to each product based on the available capacity for the time horizon (day, week or whatever is appropriate) under consideration. In the example, all capacity is available for an order of PC(1D), and then there is some fraction of the capacity available to PC(1W), and a lower fraction to PC(3W). Because the calculations assume one order at a time, the calculations may change if the order quantity is large.

The following steps can be taken to make a significant positive impact on revenue and profit. First, analyze underlying demand to obtain a relationship between price charged and demand. The result is a product design (PD) scheme. Design history databases for help in demand forecasts. Institute business process flows that employ a product control scheme. This will result in computer implemented methods and screens for order processors that will provide visibility into future plant/manufacturing facility status and also what products will be made available in what quantities. Various computer-implemented supply management tools could be used, each corresponding to one of the steps. The modules could be, for example, Demand Analyzer, Forecasting Engine and Optimizer modules, such as those available from i2 Corporation.

The above examples include simplifying assumptions to illustrate numerically the PC and PD process. However, there may be some real world realities that need to be addressed. If the order quantity is more than a given threshold, the PC scheme will have to be made more sophisticated since the calculated AP is for the last unit of capacity and may change as orders come in. If the MTO manufacturer has other suppliers, the complete upstream supply chain may have to be considered and its reliability factored in depending upon the relationship between the two. The downstream chain may also be important. If there are multiple items and capacity units (say more than one work center or materials) the VM model needs to be generalized. Once the multiple items have been mapped into multiple products, the problem is conceptually similar to one item that has been productized. The multiple resources can be handled by arriving at an AP for each resource (constrained or not–in which case it could be small or 0). If the sum of the utilized resources' AP is less than the value being obtained then the product can be made available.

It should also be noted that the PC relies on the availability of unconstrained demand, i.e., demand that exists for a product regardless of whether it will be available or not. In reality the recorded history will only have actual realized demand (or constrained demand). This can place additional burdens on the forecasting algorithms since they use the histories to forecast.

FIG. 11 illustrates an exemplary method of pricing make-to-order products. The method begins at step 100 where a demand probability value is assigned to each of a plurality of products. Each such product has an associated delivery time and price. At step 102, an expected revenue from the products is calculated for at least two available capacities. The expected revenue is a function of the demand probability values and the prices. In certain embodiments, the expected revenue may be calculated as a sum of products of the probability values and the prices. The expected revenue may be calculated in certain embodiments from a binary tree representing the probability values and the prices. Furthermore, the expected revenue may be calculated for each product in response to a product control policy. At step 104, an asking price for each of the products is calculated as the difference between a product's expected revenue from successive available capacities. At step 106, the asking price may be compared for different products at a given capacity, and the method ends.

OTHER EMBODIMENTS

Although the present invention has been described in detail, it should be understood that various changes, substitutions, and alterations can be made hereto without departing from the spirit and scope of the invention as defined by the appended claims.

APPENDIX A

Expected Revenue for FCFS for Various AC's

| Product | ER (1) | AP | ER (2) | AP | ER (3) | AP |
|---|---|---|---|---|---|---|
| P (No PD) | .5 * 800 + .5 * (.5 * 800 + .5 * .5 * 800) = 700 | 700 | .5 * (800 + 400 + 200) + .5 * (.5 * (800 + 400) + 200) = 1100 | 400 | .5 * (800 + .5* (800 + .400) + 200) + .5 * (.5 * (800 + 400) + 200) = 1200 | 100 |
| P (PD) | .5 * 800 + .5 * (.5 * 1100 + 825 5 + (.5 * 1200)) = 825 | | .5 * (800 + 850) + .5 * (.5 * (1100 + 600) + .5 (.5 * 1200)) = 1400 | 575 | .5 * (800 + .5* (1100 + 600) + 300) + .5 * (.5 * (1100 + 600) + 300) = 1550 | 150 |

APPENDIX B

Expected Revenue with PC for Various AC's

| Product/Value | AC = 1 | ER | AP | AC = 2 | ER | AP | AC = 3 | ER | AP | AC = 4 | ER | AP |
|---|---|---|---|---|---|---|---|---|---|---|---|---|
| PC (1D)/1200 | .5 * 1200 = | 600 | | .5 * 1200 = | 600 | | .5 * 1200 = | 600 | | .5 * 1200 = | 600 | |
| PC (1W)/1100 | .5 * 1100 + .5 * 600 = | 850 | 850 | .5 * (1100 + 600) + .5 * 600 = | 1150 | | .5 * (1100 + 600) + .5 * 600 = | 1150 | | .5 * (1100 + 600) + .5 * 600 = | 1150 | |
| PC (3W)/800 | .5 * 800 + .5 * 850 = | 825 | | .5 * (800 + 850) + .5 * 1150 = | 1400 | 550 | .5 * (800 + 1150) + .5 * 1150 = | 1550 | 150 | .5 * (800 + 1150) + .5 * 1150 = | 1550 | 0 |

The invention claimed is:

1. A computer-implemented method of valuing products, the method being performed using one or more processing units, the method comprising:

using one or more processing units, assigning a price to each of a plurality of products, each product comprising a plurality of product components;

using one or more processing units, assigning a demand probability value to each product;

using one or more processing units, calculating a component value for each component by performing the following steps:
  (a) assuming a beginning value for each component;
  (b) for a first component, calculating prorated values, such that for each product using that component, a prorated value is calculated on that component by calculating the difference between the product price and a value of the product's other components;
  (c) calculating a component value as a function of the prorated values and the probability values;
  (d) repeating steps (b) and (c) for all other components;
  (e) determining whether the component values converge; and
  (f) if any component value does not converge, using the calculated component value as the beginning component value and repeating steps (b) through (e) for that component; and using one or more processing units, calculating a value for each product, based on the results of the preceding step, by summing the component values of all components of that product.

2. The method of claim 1, wherein step (c) is performed by multiplying probability values by prorated values.

3. The method of claim 1, wherein step (c) is performed by obtaining a sum of products of probability values and prorated values.

4. The method of claim 1, wherein the probability values include both the probability of demand for a product and the probability that demand will arrive in a certain order relative to other products.

5. The method of claim 1, wherein the method is performed to value non-standard products and assigning prices to products is performed by assigning prices of standard products.

* * * * *